(No Model.) 2 Sheets—Sheet 1.
J. J. C. SMITH.
PROCESS OF COVERING WIRE FOR ELECTRICAL PURPOSES.
No. 276,725. Patented May 1, 1883.
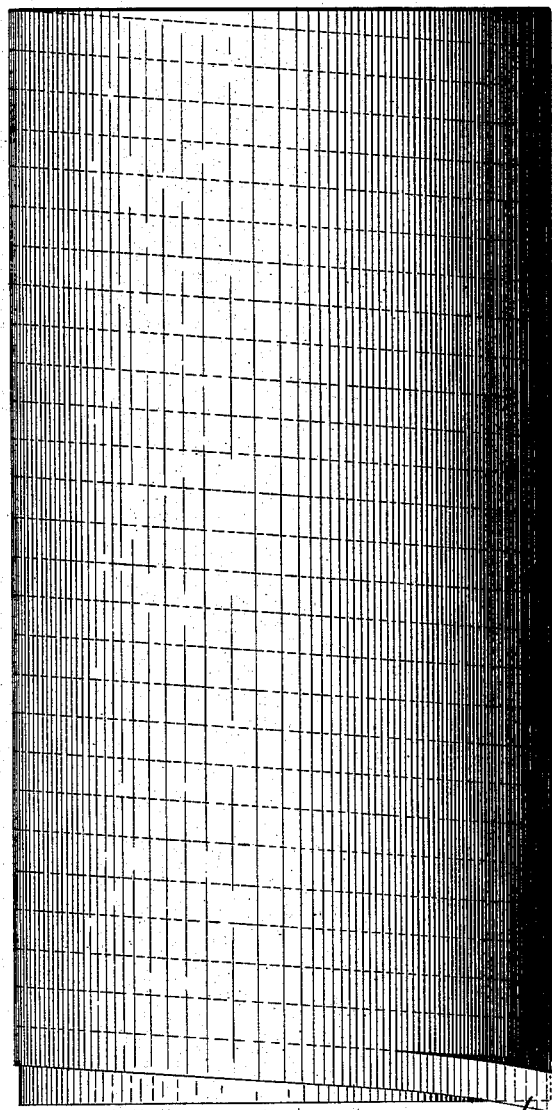

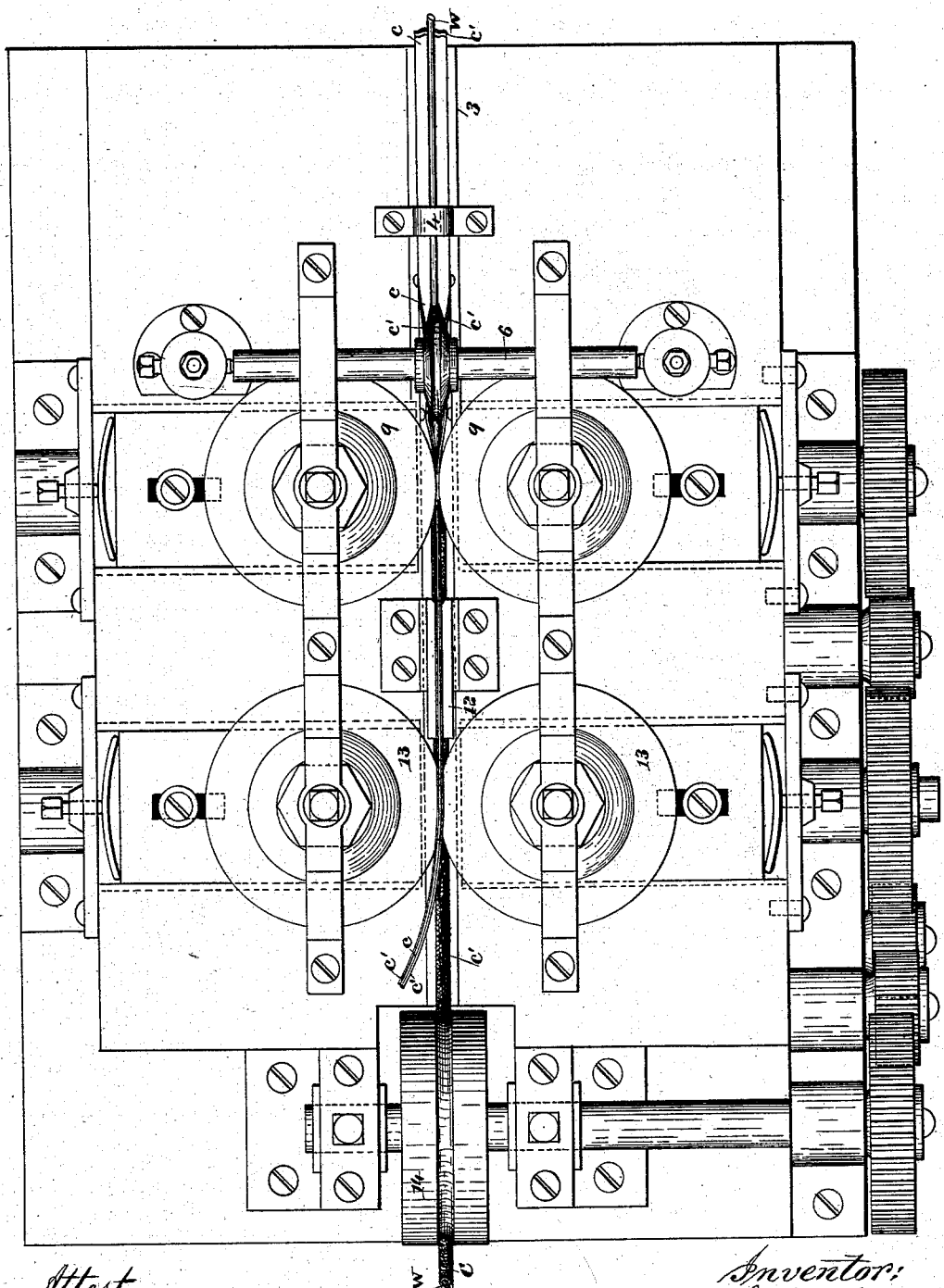

UNITED STATES PATENT OFFICE.

JOHN J. C. SMITH, OF COLLEGE POINT, NEW YORK.

PROCESS OF COVERING WIRE FOR ELECTRICAL PURPOSES.

SPECIFICATION forming part of Letters Patent No. 276,725, dated May 1, 1883.

Application filed September 20, 1882. (No model.) Patented in England October 7, 1882, No. 4,768; in France October 7, 1882; in Belgium October 7, 1882; in Germany October 19, 1882, and in Spain November 10, 1882.

*To all whom it may concern:*

Be it known that I, JOHN JOSEPH CHARLES SMITH, a citizen of the United States, residing at College Point, in the county of Queens and State of New York, have invented a new and Improved Process for Covering Wire for Electrical Purposes, of which the following is a specification.

Various modes have been devised and adopted for covering wire with insulating material, in some of which strips of rubber have been wrapped either longitudinally or spirally on the wire. In wrapping the material spirally on the wire it is difficult or impossible to tightly close the joints unless several layers are applied, causing a waste of material. It is likewise difficult or impracticable to form a perfect joint or exclude all air between the covering and the wire by bringing the material together edge to edge when the covering is applied longitudinally, as in some methods, owing to the lack of surface to which sufficient pressure may be applied or the manner in which it is done. It is very important and essential that the material shall be drawn so tightly around the wire as to expel and exclude air between the wire and the covering. A further difficulty occurs in the modes heretofore employed from the necessity of using a considerable thickness of the insulating material, thus involving greater expense and producing a body which, if the compound is to be hard or even semi-hard vulcanized rubber, will become too rigid, so that the covered wire will not possess the necessary flexibility.

In order to overcome these and other difficulties in the covering of wire with insulating material for electrical purposes, I have devised a process which consists essentially in taking rubber composition or other vulcanizable compound or any other suitable water-proof insulating compound in its plastic state, laying it in a thin film or sheet on a woven or other sufficiently strong fabric, pressing them together by calendering or otherwise, so as to incorporate one face of the rubber with the cloth, then cutting the so-prepared sheet in a long strip of sufficient width to reach around the wire, longitudinally, leaving a surplus for joining flanges, drawing this tightly around the wire, and bringing the projecting sides of the inner face of the compound together with pressure, so that the rubber is inseparably united around the wire, forming a single flange of rubber between the surplus fibrous covering. The projecting flange or edge of rubber and fibrous material thus produced is then cut off, so as to leave the wire covered with a thin jointless film or covering of rubber composition surrounded by a fibrous envelope, after which the covering is vulcanized on the wire by the requisite degree of heat applied in any usual or suitable manner, but preferably through the medium of a water bath and under heavy pressure, or packing in powdered soapstone. The covering-strip is conveniently produced by laying the sheet of woven fabric and rubber composition around a large metal drum, equal in length to the width of the sheet, joining together the meeting ends of the plastic rubber composition and woven fabric, so as to form a connected and jointless cylinder of rubber with its fibrous backing, and cutting this cylinder by means of a revolving circular cutter spirally around the drum, so as to produce a continuous strip of the required width and of great length. Combining the plastic composition with a backing of fibrous material by pressure or calendering, so that one side of the composition becomes incorporated therewith before its application to the wire, obviates much of the difficulty experienced in handling the plastic rubber composition, and produces a covering to which the necessary force may be applied without injury in stretching the insulating cover tightly around the wire with pressure, so as to exclude air and form a jointless envelope of rubber, held to the wire by atmospheric pressure. It enables me also to use with great convenience other water-proof insulating materials which it would be difficult or impossible to apply uniformly to the wire without such backing.

In order that the invention may be fully understood, I will proceed to describe it with reference to the accompanying drawings, which represent apparatus or machinery for carrying out my improved process. I reserve the right to claim said apparatus or machinery herein shown in another application or applications.

Figure 1 represents a drum or cylinder on which the fibrous material may first be laid, and afterward the plastic composition applied. The rubber and its backing are then cut spirally, as indicated by broken lines, to form a continuous strip. Fig. 2 represents a vertical longitudinal section of an apparatus for covering the wire. Fig. 3 is a top view of said apparatus.

1 represents a semicircular groove in a horizontal guide-plate, 3, in the center of a bed or table, 2. Across the guide-plate 3 is a guide, 4, for a wire, W. In advance of this guide is a grooved wheel, 5, set directly over the semicircular groove in the guide-plate. In advance of the grooved wheel are a pair of horizontal narrow rollers, 9. The lower faces or corners of these horizontal rollers are provided with quarter-circular grooves, forming, together, a semicircle, and form, with the semicircular groove in the guide-plate 3 a circular opening. 12 is a slotted guide, and 13 a pair of rotary cutters.

14 are a pair of drawing-rolls, through which the covered wire passes.

C is the covering, having fibrous backing $c'$ and rubber face or strip $c$. The strip is laid on the grooved guide-plate and the wire passed through the guide 4 over it. The wire and strip come together beneath the grooved wheel 5, which presses the wire into the strip, and the bottom of the strip and half the wire into the groove 1, thus turning up the strip on each side of the wire, forming two flanges, which are grasped by the grooved wheels 9 for the purpose of drawing the rubber composition tightly around the wire to expel the air and press the flanges together sidewise to form a jointless rubber tube within the fibrous covering, and a single flange of surplus rubber composition with excess of fibrous material projecting as a ridge. The covered wire, with this ridge, passes through the guide 12 to the cutters 13, where the surplus material is removed, leaving the article consisting of a wire with a jointless air-tight envelope and a fibrous covering with quite or almost invisible joint. The wire, as covered, is drawn between the rollers 14.

The above-described process, in itself considered, possesses several important advantages, among which are the following:

By the use of a backing of woven material and a vulcanizable composition spread thereon, cut into a narrow strip, in the manner described, laying this strip longitudinally, wrapping it transversely around the wire, and joining it on one side by means of pressure on the surface of the covering-strip, which forms flanges when brought together round the wire, I am enabled to draw the covering very tightly over the wire, effectually excluding air, insuring a uniform covering without fault, with a very thin but solid and substantial film of insulating material.

By using a very thin but uniformly-applied layer of rubber I am enabled to use a rubber compound which can be vulcanized, what may be termed "three-quarter" hard, but possessing all the good resisting qualities of hard rubber against the bad influences of heat, atmosphere, gases, oil, fungus growths, or attacks of insects, without rendering the covering liable to fractures when the wire is bent or twisted.

It is a well-known fact that hard rubber, or a rubber compound which is nearly hard, vulcanized, is very pliable when very thin, somewhat like a sheet of paper, especially so when in firm combination with woven fabric. Therefore a thin layer of such compound on the wire will have the necessary pliability.

It is also an established fact that a hard or nearly hard vulcanized rubber sheet will have the greatest resistance of any gummy or water-proof composition known against the bad influences of water, damp in unventilated places, foul atmosphere, fungous growth, acids, oil, or greasy matters, and the attack of insects.

I am aware that hard vulcanized rubber compounds have been used for covering wire; but on account of improper methods and machinery the covering had to be laid on so thick as to deprive the wire of its required state of flexibility for practical use. Hence the softer compositions are usually employed and resorted to. By my process the rubber composition is brought in close contact with the wire without the use of cement. The covering is held to the wire by atmospheric pressure. Cement is detrimental in various ways. It is liable to become porous in vulcanization and to disintegrate in use, thus impairing the tight covering of the wire.

Another very important advantage in my process consists in the uniformity with which the insulating-covering is laid around the wire, thus permitting the use of a very thin film without endangering perfect insulation or dislocating the wire from its central position, whereas with processes and machines which require the use of plastic coverings of greater thickness waste of material and imperfection in the work frequently result from the lack of uniformity in the thickness of the covering material, which is very often thin on one side of the wire, so much so that by the least handling the wire is exposed.

Another advantage of my process is that by the firm combination of a thin sheet of rubber with the cloth I can at one operation apply a fibrous covering over the gum insulation, and such fibrous covering is in perfect combination with the gum.

In all of the described methods of others the fibrous covering is either applied after the gum covering, or, if applied by one machine at one operation, the fibrous covering can always be easily detached or separated, on account of the defective methods by which it is applied.

It is of great advantage to firmly attach the plastic compound (be it rubber or any other flexible or plastic composition) with a suitable sheet of fibrous or pliable material, and then cut in strips or ribbons for laying it around the wire, because by so doing the plastic compound forms by such combination a strip or ribbon of great strength, which may be subjected to a greater strain without tearing asunder or stretching to an undesirable degree. The strips are readily reeled up for use on the covering-machine. Furthermore, the firm attachment of the fibrous strip with the plastic material forms an inseparable fibrous protecting-envelope over the thin covering of gum insulation, and gives valuable advantage to readily handle the wire during the process of covering and vulcanization, and avoids, also, the extra labor to apply a fibrous covering over the rubber after coating the wire with plastic material, as it is usually done.

I am aware that others in their methods of covering wire have used sheets, strips, or ribbons of fibrous material interposed between the strips or sheets of gum to prevent the adhesion of the plastic strips between each other when reeled up, or to permit the plastic strips to be more readily carried by the covering-machine, or else the fibrous strip or sheet was only painted over with some solutions of gums—waxy or oily substances—so as to wrap on the wire spirally, as a protection of some easily-injured coatings; but to my knowledge, and so far as records show, no one formed a firm combination of a fibrous or pliable sheet or strip with the gum in the manner and for the purpose as I do.

In order to give a fair understanding of the importance and utility of my method and point out the valuable difference between coating a fibrous sheet with solutions of gum, oil, &c., I wish to explain that solutions of rubber, gutta-percha, and other vulcanizable gums where applied to wire in one or more layers involve not only great expense in labor and material, but such coatings are unfit to undergo the process of vulcanization, because no matter how dry the coating may be the vulcanization invariably renders it porous on account of volatile oils or nature of such solvents, as a great portion of the solvent necessarily remains always with the gum and escapes only by the heat of vulcanization, which produces blisters and pores. A sheet of solid rubber composition or other vulcanizable gum, no matter however thin, applied to the fibrous covering and reduced to the desired thinness by calendering or pressure may be relied on to produce a solid and perfect sheet free from pores or blisters, if the vulcanization be properly performed.

Having thus described my invention, the following is what I claim as new therein and desire to secure by Letters Patent:

1. The processs of covering wire for electrical purposes, which consists in preparing sheets of plastic insulating material and fibrous backing combined by pressure or calendering so as to inseparably attach the fibrous backing to the plastic composition, cutting in a long strip of requisite width, drawing this tightly round the wire, which is laid lengthwise thereon, pressing the inner meeting faces of the composition together on one side of the wire, (thus producing a jointless insulating rubber envelope with a fibrous covering,) and cutting off the projecting edge or flange.

2. The process of covering wire for electrical purposes, which consists in pressing the wire into a rubber strip, c, having a fibrous backing, c', drawing the strip tightly over the wire by means of the projecting sides of the fibrous backing to expel the air and complete an envelope of rubber, pressing the sides of the fibrous backing together around the envelope, and finally removing the excess of rubber and fibrous backing between suitable cutters, as set forth.

J. J. C. SMITH.

Witnesses:
  J. M. L. WIRLEIN,
  GEORGE RAAB.